(12) United States Patent
Cooper

(10) Patent No.: US 6,770,197 B2
(45) Date of Patent: Aug. 3, 2004

(54) FLUID DISTRIBUTION DEVICE

(75) Inventor: John Cooper, Hemel Hempstead (GB)

(73) Assignee: Lucas Industries Limited, Solihull (GB)

( * ) Notice: Subject to any disclaimer, the term of this patent is extended or adjusted under 35 U.S.C. 154(b) by 151 days.

(21) Appl. No.: 10/052,743

(22) Filed: Jan. 23, 2002

(65) Prior Publication Data
US 2002/0096457 A1 Jul. 25, 2002

(30) Foreign Application Priority Data
Jan. 23, 2001 (GB) .............................................. 0101746

(51) Int. Cl.$^7$ ........................ B01D 17/038; H02K 9/00
(52) U.S. Cl. .................... 210/512.1; 210/787; 210/788; 210/153; 310/54; 310/61; 310/68 D
(58) Field of Search ................................ 210/787, 788, 210/512.1, 153; 310/54, 61, 68 D

(56) References Cited

U.S. PATENT DOCUMENTS

| 4,625,133 A | 11/1986 | Lobsinger et al. ............ 310/56 |
| 5,003,207 A | * 3/1991 | Krinickas et al. ............. 310/61 |
| 5,773,903 A | * 6/1998 | McCabria et al. ........ 310/68 D |

FOREIGN PATENT DOCUMENTS

| GB | 1 468 897 | 3/1977 |
| WO | WO 91/09251 | 6/1991 |

* cited by examiner

Primary Examiner—David A. Reifsnyder
(74) Attorney, Agent, or Firm—Mintz Levin Cohn Ferris Glovsky & Popeo, P.C.

(57) ABSTRACT

An oil or coolant distribution device is provided for attachment to a rotating shaft (2). The device includes a chamber (18) having an outlet towards a radially innermost portion thereof so as to form a weir. Centrifugal force ensures that debris in the oil or coolant is forced to the bottom of the weir where it is trapped.

11 Claims, 1 Drawing Sheet

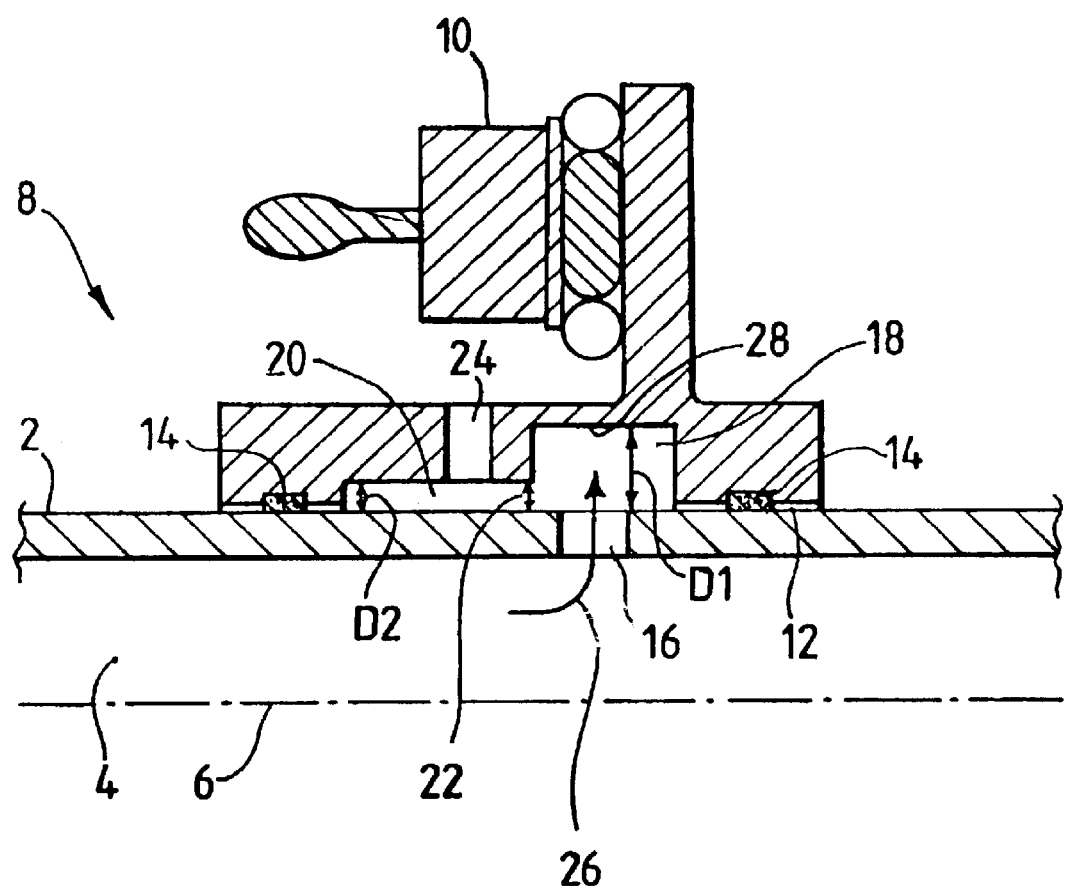

FLUID DISTRIBUTION DEVICE

FIELD OF THE INVENTION

The present invention relates to a fluid distribution device. Such a device is suitable for providing a debris resistant fluid flow path within a cooling system.

BACKGROUND TO THE INVENTION

Electrical machines, such as generators and motors, are becoming ever more compact. Furthermore, the currents being handled within such machines are generally increasing. Electrical generators frequently include rectifiers. The rectifiers are often provided as part of the rotor assembly and are mounted adjacent the rotor coils. There is little space within the generator assembly to provide heat sinks, and therefore it is necessary to pass a cooling fluid over the rectifiers in order to remove heat from them. It is important that heat is removed from the rectifiers as excessive heating will result in shortening of their working life span or possibly component failure.

It is known, within the context of a generator system, to mount rectifiers on a carriage which is attached to and rotates with the rotor shaft of the generator. The rotor shaft has a through bore through which cooling oil is pumped. A drilling is provided in the rotor shaft adjacent each rectifier such that oil can escape from the rotor shaft and spray onto the rectifier. There is, of course, a balance to be struck between the size of the drilling and the oil pump providing the flow of cooling oil. In most space constrained systems the maximum flow rate of a pump providing the cooling oil flow is constrained. The flow of cooling oil may have to be divided amongst many components and consequently it becomes desirable to keep the oil flow to any one component at a small a rate as is consistent with proper functioning of that component. This, in general, means that the drillings in the shaft are of a limited diameter. If the diameter of the drilling is too large, this results in preferential flow of oil through the large diameter drilling at the expense of oil flow to other components. However, with small diameter drillings there is a risk that debris in the oil could cause the drilling to become blocked thereby impeding the flow of cooling oil to the component.

SUMMARY OF THE INVENTION

According to the present invention, there is provided a fluid distribution device, comprising an inlet having a first width, an outlet having a second width less than the first width, and a separator, wherein the separator receives fluid from the inlet and directs solid matter along a first path and substantially debris free fluid towards the outlet, and wherein at least one aperture having a third width which is less than the second width is provided intermediate the separator and the outlet.

It is thus possible to provide a distribution device which is resistant to blocking by debris.

Advantageously the inlet is dimensioned such that it is large in comparison to the expected size of debris within the fluid, and consequently is difficult to block. Debris passing through the inlet is directed towards the separator where, because of density differences between the debris and the fluid, the debris is separated from the fluid.

Advantageously the distribution device is mounted for rotation with a shaft, with the shaft passing through a substantially central bore of the distribution device. Preferably the separator comprises a first chamber of a first depth measured with respect to the central bore of the distribution device. A fluid flow path to the outlet is provided from the first chamber at a position away from the radially outer most wall thereof. Thus, as the separator rotates with the shaft, debris is forced under the action of centrifugal forces towards the radially outer most wall where it becomes held. Fluid substantially free of debris can then flow towards the outlet.

Preferably the first chamber is in fluid flow communication with a second chamber. The chambers may join at a step like interface. The interface between the first and second chambers is advantageously partially bounded by the rotor shaft in order to form an interface aperture of the third width. The interface aperture may be in the form of an elongate slot which can serve to trap debris which has not been centrifuged out of the fluid. The elongate nature of the slot means that any single piece of debris which gets trapped at the slot only blocks a relatively small portion of the slot whilst leaving the remainder of the slot open to fluid flow. The second chamber then leads to an outlet duct which directs oil towards a component to be cooled. The width of the outlet duct is greater than the width of the slot, thereby ensuring that any debris which passes through the slot will also pass through the outlet.

DESCRIPTION OF THE DRAWING

The present invention will further be described, by way of example, with reference to the accompanying drawing, which is a schematic cross section through a rectifier carrier including a distribution device constituting an embodiment of the present invention.

DETAILED DESCRIPTION OF THE INVENTION

The arrangement shown in the accompanying FIGURE comprises a rotor shaft 2 having a through bore 4 therein which receives oil under pressure from a pump. The chain line 6 denotes the axis of rotation of the shaft 2. A rectifier carrier, generally indicated 8 is affixed to and rotates with the shaft 2. The carrier has a plurality of rectifiers attached thereto, of which only one, 10, is shown for clarity.

The carrier defines an annular bore 12 through which the shaft 2 passes in a close fit. Seals 14 are provided to form a fluid tight seal between the bore 12 of the carrier and the outer surface of the shaft 2. An aperture 16 provides an oil delivery path from the bore 4 of the shaft 2 into a first chamber 18 formed within the carrier 8. The first chamber 18 has a depth D1. A second chamber 20 having a depth D2 is also formed within the carrier 8 and is in fluid flow communication with the first chamber 18 via an interface region 22. Both chambers 18 and 20 are defined, in part, by the surface of the shaft 2. An outlet duct 24 is in fluid flow communication with the second chamber 20 and, in use, removes fluid from the second chamber 20 and directs it towards an associated rectifier 10.

In use, the shaft and the rectifier carrier 2 are rotating and oil is provided to the bore 4 via a pump. Oil within the bore 4 flows through the passageway 16, as indicated by the arrow 26 and into the chamber 18. Because of the rotary motion of the device, particulate matter and other debris is urged towards the radially outermost wall 28 of the first chamber 18, where it becomes held by centrifugal force. The substantially debris free fluid in the chamber then flows via the elongate slot 22 from the first chamber 18 into the second chamber 20. The width of the slot 22 is equal to D2, which is a width selected to be less than the width of the outlet duct 24. Thus, debris having a width greater than D2 and which is not trapped against the wall 28 may then become engaged in or against the slot 22 where it is held. Each item of debris only blocks a small portion of the slot, and consequently flow through the slot remains substantially unaffected by the trapping of a few items of debris therein. Once fluid has passed through the slot 22 it then flows towards the outlet duct 24 and is sprayed onto the rectifier 10 in order to cool it. The diameter of the outlet duct 24 is larger than that of slot 22 such that any debris which passes through the slot 22 is also guaranteed to pass through the outlet 24.

The cooling oil is then collected in a sump (not shown) and returned to the pump via an oil cooler for re-circulation.

It is expected that, for constructional convenience, the passage 16 and the outlet 24 will both be circular drillings. It is also likely that the first and second chambers 18 and 20 are grooves extending the full circumference of the carrier. Where the inlet 16 and outlet 24 are drillings, the width thereof should be construed as the diameter thereof. However, it will also be apparent that other geometrys could be used, for example elongate slots and there the width should be construed as being the smallest dimension of the slot. Other geometrys, such as ellipses are also possible and the term width should be construed in a proposive manner.

What is claimed is:

1. A fluid distribution device for providing a flow of cooling fluid to a device to be cooled, comprising an inlet having a first width, and an outlet for providing a flow of fluid to the device to be cooled, the outlet having a second width less than the first width, and a separator, wherein the separator receives fluid from the inlet and directs solid matter along a first path and substantially debris free fluid towards the outlet, and wherein at least one aperture having a third width which is less than the second width is provided intermediate the separator and the outlet, such that solid matter passing through the at least one aperture can pass through the outlet.

2. A fluid distribution device as claimed in claim 1, in which the inlet is dimensioned such that it is larger than the expected size of the debris within the fluid.

3. A fluid distribution device as claimed in claim 1, in which the separator uses density differences between the debris and the fluid to separate the debris from the fluid.

4. A fluid distribution device as claimed in claim 1, wherein, in use, the distribution device is subject to rotation.

5. A fluid distribution device as claimed in claim 1, in which the distribution device has a central bore and the distribution device is mounted for rotation on a shaft passing through the central bore.

6. A fluid distribution device as claimed in claim 5, in which the separator comprises a first chamber having a first depth measured with respect to the central bore, and a fluid flow path to the outlet is provided at a position away from a radially outermost wall of the first chamber.

7. A fluid distribution device as claimed in claim 6, in which the first chamber is in fluid flow communication with a second chamber.

8. A fluid distribution device as claimed in claim 7, in which the at least one aperture having the third width is at the interface between the first and second chambers.

9. A fluid distribution device as claimed in claim 8, in which the interface between the first and second chambers is partially bounded by the shaft.

10. A fluid distribution device as claimed in claim 1, in which the at least one aperture having a third width is in the form of an elongate slot.

11. A fluid distribution device as claimed in claim 1 in combination with a rotor shaft, wherein the fluid distribution device is coaxially disposed with respect to the rotor shaft and engages with an outer surface of the rotor shaft.

* * * * *